(12) United States Patent
Larsson

(10) Patent No.: US 8,941,673 B2
(45) Date of Patent: Jan. 27, 2015

(54) RENDERING IMAGES IN A REMOTE WEB BROWSER

(75) Inventor: Alexander Larsson, Hägersten (SE)

(73) Assignee: Red Hat, Inc., Raleigh, NC (US)

( * ) Notice: Subject to any disclaimer, the term of this patent is extended or adjusted under 35 U.S.C. 154(b) by 564 days.

(21) Appl. No.: 13/291,869

(22) Filed: Nov. 8, 2011

(65) Prior Publication Data

US 2013/0113833 A1    May 9, 2013

(51) Int. Cl.
| | |
|---|---|
| G06T 1/00 | (2006.01) |
| G06F 3/14 | (2006.01) |
| H04L 29/08 | (2006.01) |
| G06T 11/00 | (2006.01) |
| G06F 17/30 | (2006.01) |
| G09G 5/34 | (2006.01) |

(52) U.S. Cl.
CPC .............. *G06F 3/1462* (2013.01); *H04L 67/08* (2013.01); *G06T 11/00* (2013.01); *G06F 17/30* (2013.01); *G09G 5/346* (2013.01); *G09G 2320/106* (2013.01); *H04L 67/04* (2013.01); *H04L 67/02* (2013.01); *G06G 2209/509* (2013.01)

USPC ......................................................... 345/522

(58) Field of Classification Search
CPC ................... G06F 17/30861; G06F 17/30893; G06F 3/14; G06F 3/1462; H04L 67/02; H04L 67/2842; H04L 67/2847
USPC .................................................. 345/522, 557
See application file for complete search history.

(56) References Cited

U.S. PATENT DOCUMENTS

| | | | |
|---|---|---|---|
| 7,437,364 B1 * | 10/2008 | Fredricksen et al. ................. | 1/1 |
| 2010/0118039 A1 * | 5/2010 | Labour ......................... | 345/522 |
| 2012/0151373 A1 * | 6/2012 | Kominac et al. .............. | 715/740 |

* cited by examiner

*Primary Examiner* — Hua Nguyen
(74) *Attorney, Agent, or Firm* — Lowenstein Sandler LLP

(57) ABSTRACT

A processing device receives graphical output data from an application. The processing device generates, based on the graphical output data, at least one of an image or a drawing command that is formatted for an application programming interface (API) of a web browser. The processing device then transmits at least one of the image or the drawing command to a web browser instance executing on a remote client device, wherein the web browser instance is natively capable of rendering at least one of the image or the drawing command to a display on the remote client device.

24 Claims, 8 Drawing Sheets

RENDERING IMAGES IN A REMOTE WEB BROWSER

FIELD OF INVENTION

Embodiments of the invention relate to image rendering, and more specifically to performing image rendering on a remote device using standard APIs included in web browsers.

BACKGROUND OF THE INVENTION

There are numerous remote desktop systems that enable a user of a client machine to interact with an application running on a server machine. However, these remote desktop applications generally require the installation of agents on the client machine. The agents typically communicate with the server machine using proprietary communication protocols to receive image data for rendering on a local display and for sending mouse commands and keyboard commands to the server machine.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE PRESENT INVENTION

Figure 1:
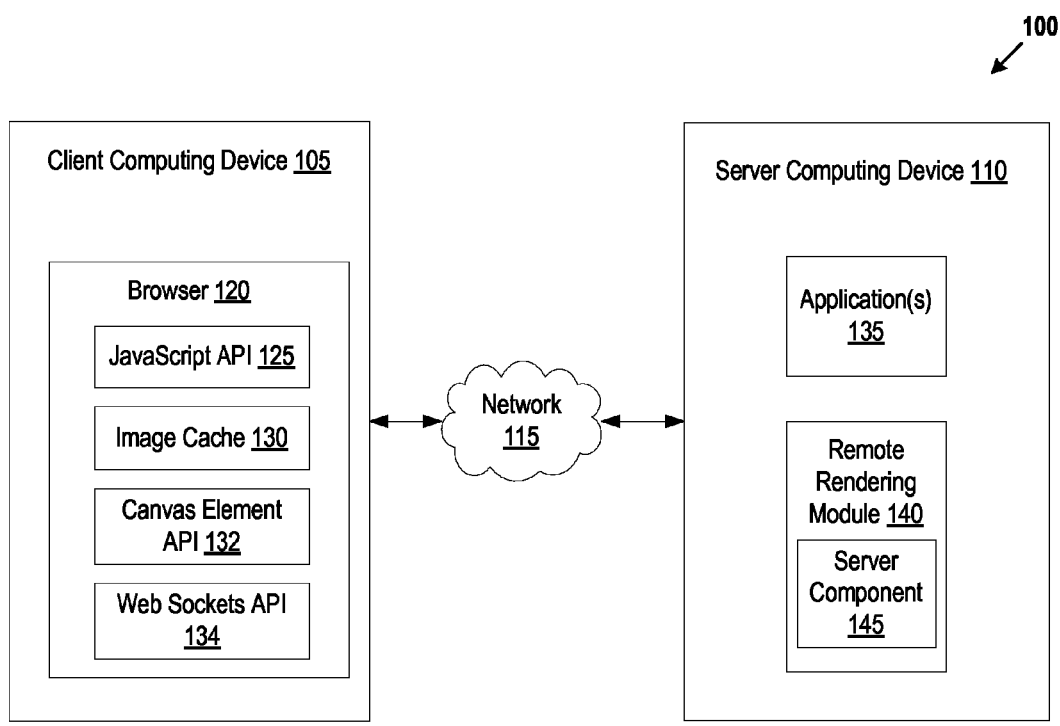
FIG. 1 illustrates an exemplary network architecture in which embodiments of the present invention may operate.

Methods and systems for performing image rendering on a remote device using standard APIs included in a web browser running on the remote device are described herein. In one embodiment, a processing device receives graphical output data from an application. The processing device generates, based on the graphical output data, an image and/or a drawing command that is formatted for an application programming interface (API) of a web browser. In one embodiment, the processing device generates a first rendering of the graphical output data in a first buffer based on the graphical output data, and generates the image and/or drawing command from the first rendering. In one embodiment, the processing device compares the first rendering in the first buffer to a second rendering in a second buffer, wherein the second rendering reflects a current rendering in the display on the remote client device. The processing device may then determine differences between first pixel values of first pixels in the first rendering and second pixel values of corresponding second pixels in the second rendering based on the comparison. In such an embodiment, the generated image comprises the differences between the first pixel values and the second pixel values, and the drawing command comprises a command to add the differences to corresponding pixels of the current rendering in the display. The processing device may update the second rendering in the second buffer based on the first rendering in the first buffer. The processing device transmits at least one of the image or the drawing command to a web browser instance running on a remote client device, wherein the web browser instance is capable of natively rendering the image and/or the drawing command to a display on the remote client device (e.g., using the API without any additional application, extension or plugin).

Embodiments of the present invention enable an application running on a server machine to render image data in a display of a remote client device and to receive input commands (e.g., mouse commands and keyboard commands) from the client device using standard APIs of a web browser running on the client device. Therefore, embodiments of the present invention enable remote application usage within a web browser instance without the installation of any agents, extensions, plugins or other applications on the client device. Additionally, no changes typically need to be made to the application running on the server machine to enable the application to render image data within the browser.

FIG. 1 illustrates an exemplary network architecture 100, in which embodiments of the present invention may operate. The network architecture 100 may include a client computing device 105 connected to a server computing device 110 via a network 115. Network 115 may be a private network (e.g., a local area network (LAN), wide area network (WAN), intranet, etc.), a public network (e.g., the Internet), or a combination of a private network and a public network.

Client computing device (hereinafter referred to simply as client) 105 may be a computing device such as, for example, a desktop computer, laptop computer, rackmount server, blade server, cellular phone, personal digital assistant (PDA), tablet computer, netbook, etc. In one embodiment, client 105 includes a browser 120. Browser 120 is an application that enables client 105 to display and interact with text, images, and other information provided by servers. Browser 120 may be a web browser configured to display web pages (e.g., by using hypertext transfer protocol (HTTP), extended markup language (XML), JavaScript, etc.) and receive and/or consume other web based content (e.g., digital videos, digital music, remote services, etc.).

In one embodiment, browser 120 supports hypertext markup language 5 (HTML5). Accordingly, in one embodiment, browser 120 includes a JavaScript application programming interface (API) 123, a canvas element application programming interface (API) 132 and a web sockets API 134. The JavaScript API 125 enables use of the JavaScript scripting language that runs applications and other code inside of a sandbox. The sandbox is a security mechanism for separating running applications, and provides an isolated execution environment for the applications. Using the JavaScript API 125, the browser 120 may download JavaScript code from a remote server and run the JavaScript code within the JavaScript sandbox.

The canvas element API 132 enables the browser 120 to perform dynamic, scriptable rendering of two dimensional (2D) shapes and bitmap images in a display. The canvas element API 132 provides scripts with a resolution-dependent bitmap canvas. This bitmap canvas can be used to render any bitmap images in a window included in a display.

The web sockets API 134 enables bi-directional and full-duplex communications over a single transmission control protocol (TCP) socket. Via an active web socket connection, browser 120 may receive data (e.g., images and commands) from a remote server without first sending a request to the remote server. Images may also be received in response to sending requests.

Server computing device (hereinafter referred to simply as server) 110 may be a computing device such as, for example, a desktop computer, laptop computer, rackmount server, blade server, cellular phone, personal digital assistant (PDA), tablet computer, netbook, etc. Server 110 hosts one or more applications 135 that may provide services to client 105. Some applications 135 may be traditional server applications that provide services such as database services, systems management services, network monitoring services, transactional services, webpage viewing services, etc. to client 105. Other applications 135 may be applications that were not designed to serve data to remote clients (e.g., applications that cannot be directly accessed via a network). For example, applications 135 may include word processing applications, spreadsheet applications, email applications, games, or any other applications that are designed to receive inputs (e.g., mouse inputs and keyboard inputs) from local input devices and to provide outputs (e.g., graphical outputs and audio outputs) to local output devices (e.g., to a local display).

Server 110 includes a remote rendering module 140. Remote rendering module may be a standalone application, a plugin, an extension, a library, or some other software or firmware construct. In one embodiment, the remote rendering module 140 is a component of a rendering library such as a user interface rendering library. A rendering library is a set of instructions that can be used by applications to render images. The rendering library can be used to provide a visual environment for interacting with a computing device. Rendering is the process of generating an image from a model and/or additional graphics data. One example of a rendering library is the C library of user interface toolkit (GTK). Remote rendering module 140 receives graphics data from applications 135, and causes the graphics data to be rendered within a browser window of browser 120 using native APIs included in browser 120. The received graphics data may be API calls to a native user interface API (e.g., GTK). The API calls may be to draw lines, draw rectangles or other shapes, fill in areas with specified colors, gradients or source images, and so on. In one embodiment, an application 135 generates the graphics data and provides the graphics data to the remote rendering module 140 in the same manner that the application would typically provide graphical output data for rendering on a local display. For example, the remote rendering module 140 may replace a library and/or interface layer that renders graphical output data to a local display. Alternatively, or in addition, remote rendering module 140 may intercept graphical output data that will be rendered on a local display of server 110 (e.g., graphical output data sent to a library or interface layer). No changes to the application 135 are typically necessary to enable the application to render graphical output data to client 105. For example, application 135 may be a freshly installed Microsoft Word application with no plugins, extensions or other modifications.

Remote rendering module 140 performs one or more operations based on the received graphical output data (e.g., based on received API calls to a user interface API). These operations may include generating an image and/or a drawing command. In one embodiment, the image is a bitmap image. The drawing command may be formatted for the canvas element API 132. In one embodiment, the drawing command is a command to render the generated image on a display within a window of a web browser.

In one embodiment, remote rendering module 140 includes a server component 145. The server component 145 may handle communications to and from browser 120 on client 105. In one embodiment, the server component 145 is configured to receive input commands from the browser 120. Such input commands may include mouse commands, keyboard commands, scrolling commands, etc. Browser 120 may send these input commands to server component 145 as client 105 receives user inputs (e.g., when a user presses a key or moves a mouse). Server component 145 is additionally configured to send data to browser 120. The data sent to browser 120 may include JavaScript code, images, drawing commands, and/or other types of data (e.g., traditional html code). The drawing commands and images may be sent to the browser 120 in response to requests from the browser 120. Server component 145 may also send the images and drawing commands to the browser 120 unsolicited via a bi-directional connection. The bi-directional connection may be a web sockets connection that has been set up using the web sockets API 134.

In one embodiment, remote rendering module 140 causes the browser 120 to maintain an image cache 130. The image cache 130 may include a specified number of images. In one embodiment, the image cache 130 holds those images that were most recently received by browser 120 from remote rendering module 140. In one embodiment, the image cache 130 holds specified commonly used images (e.g., button graphics, window border graphics, etc.). For images that are stored in the image cache 130, remote rendering module 140 may direct the browser 120 to render specified images from the image cache 130 rather than resending those images to the browser 120. This may reduce bandwidth usage and network traffic.

Figure 2:
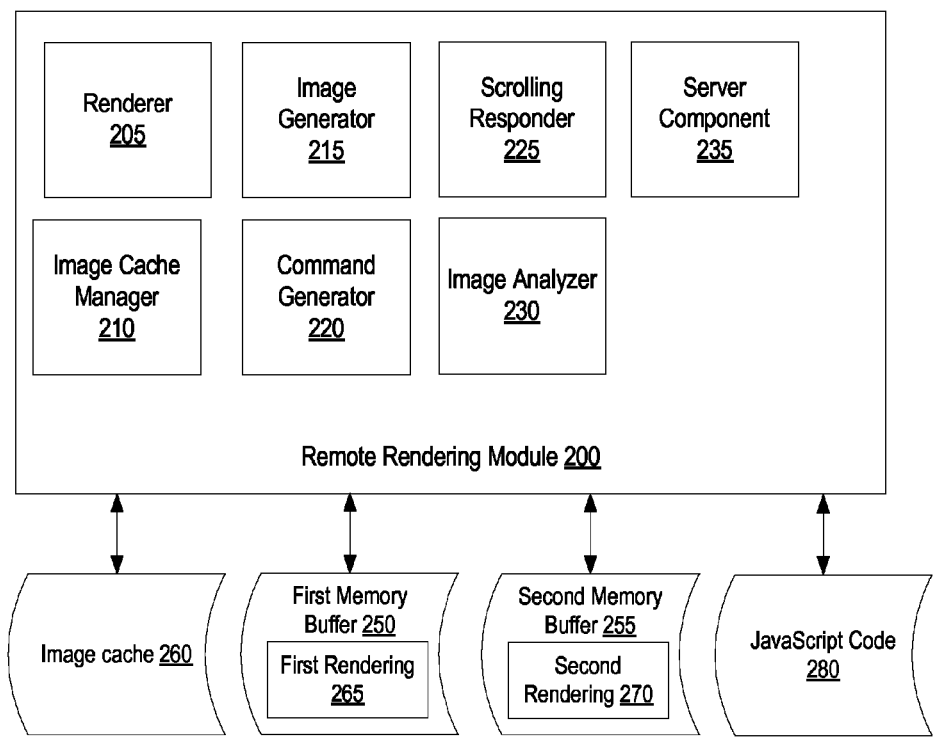
FIG. 2 is a block diagram of one embodiment of a remote rendering module.

FIG. 2 is a block diagram of one embodiment of a remote rendering module 200. The remote rendering module 200 may correspond to remote rendering module 140 of FIG. 1. In one embodiment, the remote rendering module 200 includes a renderer 205, an image cache manager 210, an image generator 215, a command generator 220, a scrolling responder 225, an image analyzer 230 and a server component 235. In alternative embodiments, some or all of these modules may be combined into a single module, or individual modules may be separated into multiple modules.

Server component 235 is preferably a bare bones server module having a small footprint (e.g., low memory requirements and/or low processor requirements). However, embodiments of the present invention work equally well with other types of server components (e.g., server components that have many features and consume significant memory and/or processor resources). Server component 235 is configured to serve content from an application to a remote client. Server component 235 establishes a connection with a remote client upon a connection request from the client. In one embodiment, the connection is a bi-directional communication connection established using web sockets. Accordingly, server component 235 can send data to the client without first receiving a client request. This may enable remote rendering module 200 to send periodic or continuous display updates to the client.

In one embodiment, server component 235 downloads JavaScript code 280 to the client. This may be performed using a regular hypertext transport protocol (HTTP) request. A web browser running on the client may execute the JavaScript code inside of a JavaScript sandbox, which then sets up a bi-directional connection. The JavaScript code may include functions for generating and maintaining an image cache, for executing drawing commands generated by the remote rendering module 200, and/or for performing other operations.

Once server component 235 has an active connection with a client (e.g., with a web browser running on a client), server component 235 receives input commands from the client as a user moves a mouse and/or presses keys on a keyboard. Server component 235 provides these input commands to an application connected to remote rendering module 200. The application may perform actions in response to the input command, and may generate graphical output data. The application may also generate graphical output data based on internal operations of the application that are not responsive to inputs from the client. Remote rendering module 200 is configured to process the graphical output data, and server component 235 is configured to send a result of that processing to the client device, as described below.

Remote rendering module 200 receives or intercepts graphical output data from the connected application. The graphical output data includes instructions for drawing images such as buttons, shapes, text, etc. In one embodiment, the graphical output data includes instructions for drawing a window for an application, including all buttons, text, scrollbars, toolbars and other 2D graphics included in the window. The graphical output data may be formatted according to a protocol used by a graphical API, framework or toolkit. For example, the graphical output data may be formatted as calls to the drawing API in the user interface toolkit (GTK) for rendering to a display. These calls may include API calls to perform actions such as draw lines, draw rectangles or other shapes, fill areas with specified colors, gradients or source images, and so on.

Renderer 205 renders the received graphical output data to a first memory buffer 250 to generate a first rendering 265. The first memory buffer 250 includes a designated memory space, which may be a volatile memory (e.g., random access memory (RAM). In one embodiment, the first rendering 265 is an image bitmap generated from the graphical output data.

Image generator 215 generates an image based on the first rendering 265. The image generated by image generator 215 has a format that can be processed by an API of a web browser. For example, the image may have a format that can be processed by the canvas element API. In one embodiment, the generated image is a portable network graphics (PNG) file. However, the image may have another raster graphic file format, such as graphics interchange format (GIF), tag image file format (TIFF), BMP, JPEG, etc. Alternatively, the image may have a vector graphic format such as scalable vector graphics (SVG) format, vector markup language (VML) format, Windows metafile (WMF) format, etc.

In one embodiment, second memory buffer 255 stores a second rendering 270 that reflects a current rendering in a browser window on a display of a remote client device. The second rendering 270 in one embodiment is an image bitmap generated from previous graphical output data received from the application. In one embodiment, image generator 215 compares pixel values of pixels in the first rendering 265 to pixel values of corresponding pixels in the second rendering 270. Each pixel value may describe how bright a pixel is and/or what color the pixel is. The color information may be a set of red, green and blue color values. For example, the first rendering 265 and second rendering 270 may each be renderings of rectangles that are 380 pixels by 420 pixels, and thus include 159,600 pixels. Rendering comparator 210 may compare pixel 1 from the first rendering to pixel 1 from the second rendering, pixel 2 from the first rendering to pixel 2 of the second rendering, and so on. In one embodiment, image generator 215 subtracts pixel values of pixels from the first rendering from pixel values of corresponding pixels in the second rendering to generate an image file. Pixels from the first rendering that match corresponding pixels from the second rendering represent images that are unchanged by a display update, and have a difference value of zero. For example, the first rendering and second rendering may each include the same application buttons at the top of the rendering. In such an instance, the resultant pixel values for pixels representing the application buttons may include a 0 intensity, 0 red, 0 green and 0 blue since the image of the buttons is unchanged. The image file generated based on pixel value differences may be much smaller than a standard image file. For example, image files with a large number of zeros can be compressed very efficiently.

Command generator 220 generates a drawing command. The drawing command, when executed by a web browser, will cause the web browser to render a specified image to a window on a display of a client device. Typically, the specified image will be an image generated by image generator 215. In one embodiment, command generator 220 generates a command to render an image that was generated based on differences between pixel values of pixels in the first rendering 265 and pixel values of corresponding pixels in the second rendering 270. In such an embodiment, the drawing command directs the web browser to add the pixels values of pixels in the image to current pixel values of corresponding pixels in a current rendering. This is in contrast to a conventional drawing command, which discards existing pixel values and replaces the discarded pixel values with new pixel values.

Once the image and/or drawing command are generated, server component 235 transmits the image and/or drawing command to the remote client. Server component 235 may initiate communication with the client via a bi-directional connection, and may send the image and/or drawing command to the client in the communication.

In one embodiment, image cache manager 210 maintains an image cache 260. In such an embodiment, a client is also made to maintain a copy of the image cache 260. The image cache 260 maintained by image cache manager 210 and the client's image cache may maintain synchronization by having the same cache size, cache advancement policies, cache ordering policies and/or cache eviction policies. The image cache 260 may include a specified number of recently generated images. For example, the image cache 260 may include the 100 most recently generated images. In one embodiment, the image cache 260 has a first in first out (FIFO) cache eviction policy. In another embodiment, images are ordered in the image cache 260 based on a number of times the images have been used. For example, an image that was used 30 times would stay in the image cache longer than an image that was used only twice.

In one embodiment, the image cache 260 includes a set of pre-generated images. These pre-generated images may be associated with a particular application. In one embodiment, image generator 215 maintains a record of the number of times that particular images are used by an application. This record may be based on the contents of the image cache 260 during different stages of previous sessions between the remote rendering module 200 and clients. For example, contents of the image cache 260 may be recorded periodically and/or at the end of a session. Those images that are most frequently used (and thus that are in the set of pre-generated images) may automatically be downloaded to a client when a new session is established with the client for a particular application. In one embodiment, the image cache 260 includes a first fixed cache portion that includes the pre-generated images and a second dynamic cache portion that includes the most recently used images. Alternatively, the image cache may be preloaded with the pre-generated images, and the pre-generated images may later be replaced via cache eviction policies.

If an image cache 260 is maintained by image cache manager 210, then image generator 215 may compare generated images to cached images in the image cache. If a generated image (or a portion of a generated image) matches an image in the image cache, then that image (or that portion of an image) does not need to be resent to the client. Accordingly, if a generated image matches a cached image, then the generated command includes an identification of the image (or image portion) and coordinates indicating where that image (or image portion) should be placed in a rendering. Since image cache 260 matches an image cache on the client, command generator 220 may identify the image by an identified position in the image cache (e.g., image 4 in the image cache). Use of the image cache may reduce a bandwidth usage and reduce latency.

One common operation in many applications is a scrolling operation. In a scrolling operation, often at least a portion of the displayed rendering is simply repositioned (e.g., transposed vertically or horizontally). In one embodiment, remote rendering module 200 includes a scrolling responder 225 to optimize image generation and command generation for scrolling commands. Scrolling responder 225 may listen for scrolling commands. A scrolling command is a higher level command than a mouse command or keyboard command. Accordingly, scrolling responder 225 may listen for scrolling commands at the application level. If a scrolling command is identified, scrolling responder 225 determines a scrolling direction and a number of pixels scrolled from the scrolling command. Scrolling responder 225 may also identify an area of the rendering (and thus of a display on the client) that is affected by the scrolling command. Command generator 220 uses this information to generate a command to copy a portion of a current rendering in a display on the client (e.g., the second rendering 270) and pasting the portion to a new region of the rendering that is transposed from the copied portion by the determined number of pixels in the determined scrolling direction. Therefore, the web browser on the client may use the current rendering to render a portion of the display. This reduces an amount of image data that is sent to the client in response to a scrolling command.

There are other instances than scrolling in which an image is repositioned from a first region in a display to a second region. For example, any animated graphics may include images that move around in the display. In one embodiment, image analyzer 230 analyses first rendering 265 and second rendering 270 to identify shared images in the two renderings. Standard image analysis techniques may be used to perform the analysis. Image analyzer 230 may identify images that are in different locations in the first rendering 265 than in the second rendering 270. When image analyzer 230 identifies such images, image analyzer notifies image generator 215 and command generator 220. Image generator 215 may then exclude such images from a generated image, and command generator 220 may generate a command to copy an image from a first region of the second rendering 270 and copy the image to a second region based on the image analysis.

In one embodiment, images generated by image generator are compressed images such as PNGs. In another embodiment, the images are uncompressed images. In such an embodiment, remote rendering module 200 may compress an entire data stream that will be sent to the remote client. This may include multiple images, commands and/or additional data. By compressing the entire stream together, greater compression efficiency may be achieved.

FIGS. 3-7 are flow diagrams of embodiments for methods of rendering graphical data in a web browser of a remote client device. The methods may be performed by processing logic that may comprise hardware (circuitry, dedicated logic, etc.), software (such as is run on a general purpose computer system or a dedicated machine), or a combination of both. In various embodiments the methods described in FIGS. 3-7 may be performed by a computing device executing a remote rendering module, such as remote rendering module 200 of FIG. 2. Some embodiments described with reference to FIGS. 3-7 discuss rendering data to a single window in a browser. However, it should be understood that a single application may be associated with multiple different windows. Accordingly, the methods of FIGS. 3-7 may be performed concurrently for multiple different windows of an application. Each of the different windows may be associated with a distinct first memory cache and second memory cache.

Figure 3:
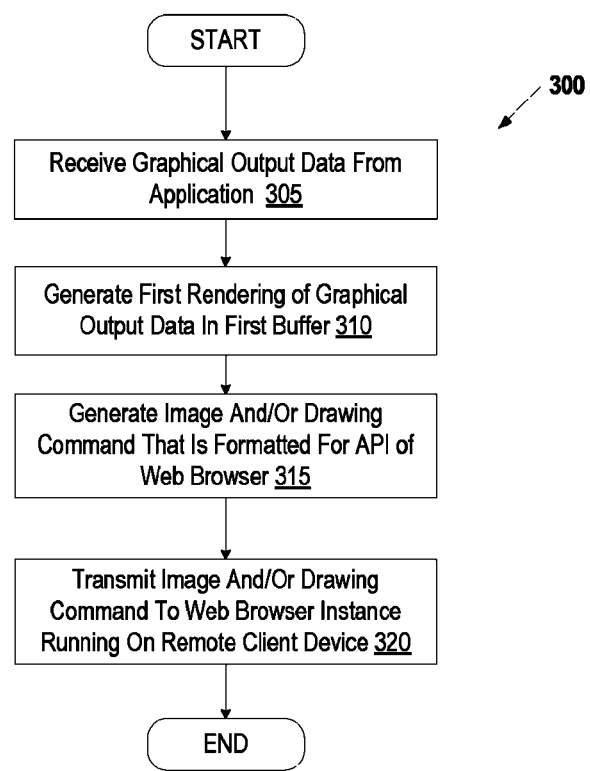
FIG. 3 is a flow diagram of one embodiment for a method of rendering graphical data in a web browser of a remote client device.

FIG. 3 is a flow diagram of one embodiment for a method 300 of rendering graphical data in a web browser of a remote client device. Method 300 may be performed by a server computing device after a connection such as a web sockets connection has been established with a client device. At block 305 of method 300, processing logic receives graphical output data from an application. The application may be a web application or may be a conventional application designed for local use on a personal computer, tablet computer, notebook, mobile phone, etc. The graphical output data may include instructions for drawing images such as buttons, shapes, text, etc. At block 310, processing logic generates a first rendering of the graphical output data in a first buffer. In one embodiment, the first rendering is an image bitmap generated from the graphical output data.

At block 315, processing logic generates an image and/or drawing command that is formatted for an API of a web browser based on the first rendering. Accordingly, the web browser is natively capable of rendering the image and/or drawing command. In one embodiment, the image and/or drawing command are formatted for processing by a canvas element API of a web browser. Various embodiments for generating the image and/or drawing command are described below with reference to FIGS. 4-7. Returning to FIG. 3, at block 320, processing logic transmits the image and/or drawing command to a web browser instance running on a remote client device. Processing logic may receive new or updated graphical output data periodically or continuously. Accordingly, method 300 may be repeated until a connection to the client device is terminated or the application is terminated.

Figure 4:
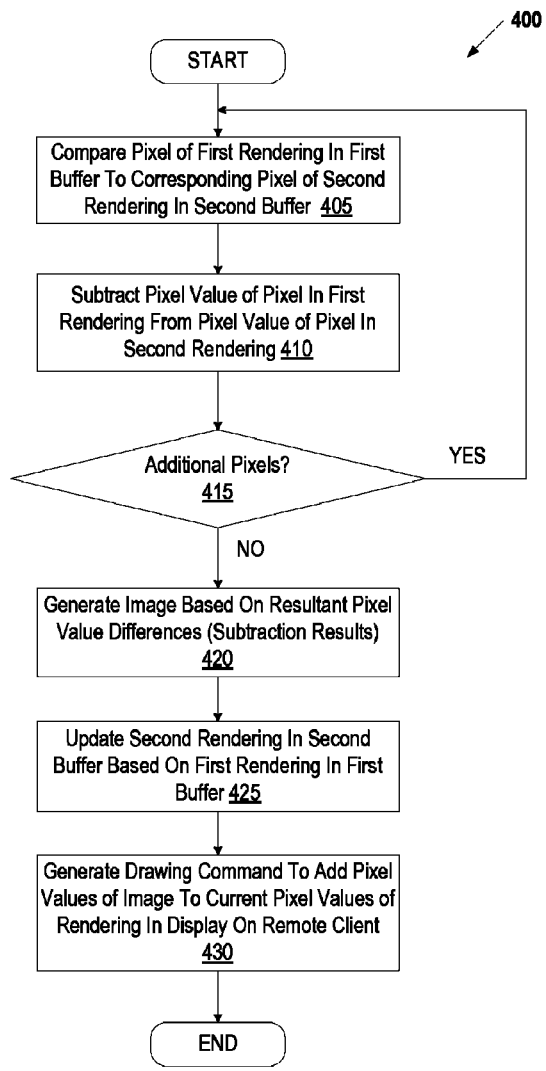
FIG. 4 is a flow diagram of one embodiment for a method of generating a command to render an image in the web browser on the remote client device and/or generating the image.

FIG. 4 is a flow diagram of one embodiment for a method 400 of generating a command to render an image in a web browser on a remote client device and/or generating the image. In one embodiment, method 400 is performed at block 315 of method 300.

At block 405 of method 400, processing logic compares a pixel of a first rendering in a first buffer to a corresponding pixel of a second rendering in a second buffer. At block 410, processing logic subtracts a pixel value of the pixel in the first rendering from a pixel value of the pixel in the second rendering. The method then proceeds to block 415, at which processing logic determines whether all pixels from the first rendering have been compared to corresponding pixels of the second rendering. If there are additional pixels to be compared, the method returns to block 405. If there are no additional pixels to compare, the method continues to block 420.

At block 420, processing logic generates an image based on resultant pixel value differences between pixels of the first rendering and corresponding pixels of the second rendering (based on the subtraction results). At block 425, processing logic updates the second rendering in the second buffer based on the first rendering in the first buffer. In one embodiment, processing copies the first rendering and pastes it into the second buffer. At block 430, processing logic generates a drawing command to add pixel values of the generated image to current pixel values of corresponding pixels in a current rendering in a display on a remote client.

Figure 5:
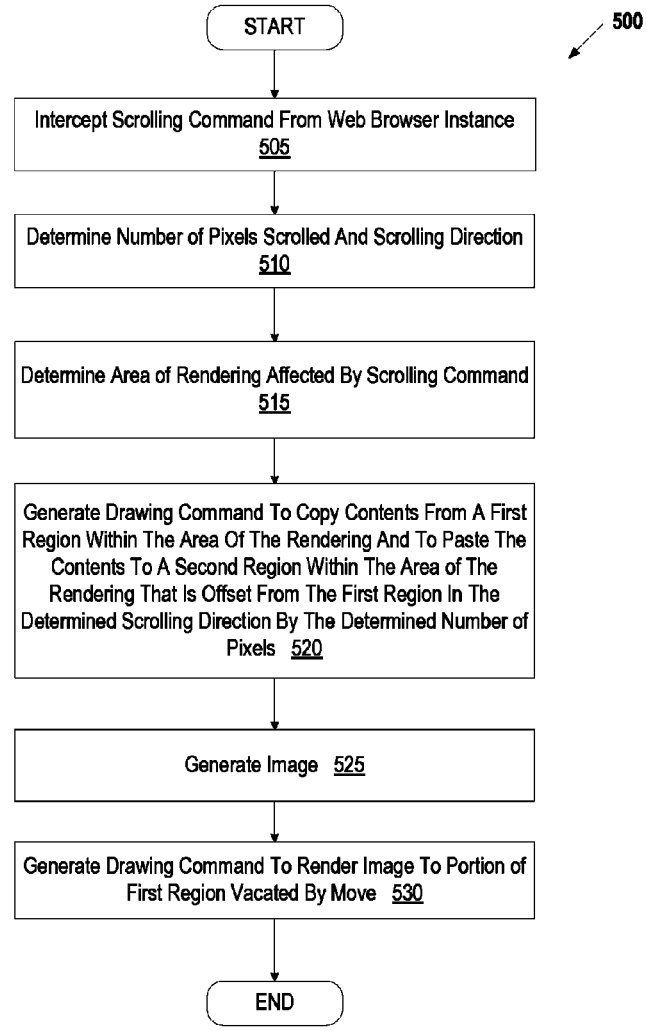
FIG. 5 is a flow diagram of one embodiment for a method of optimizing rendering of images on a remote client device based on a scrolling command.

FIG. 5 is a flow diagram of one embodiment for a method of optimizing rendering of images on a remote client device based on a scrolling command. Method 500 may be performed in conjunction with method 300 and/or method 400. In one embodiment, blocks 510 to 530 of method 500 are performed at block 315 of method 300.

At block 505 of method 500, processing logic intercepts a scrolling command from a web browser instance. The scrolling command may be based on a mouse command and/or keyboard command that will cause an application to perform scrolling. At block 510, processing logic determines a number of pixels to be scrolled in response to the scrolling command. Processing logic additionally determines a scrolling direction. At block 515, processing logic determines an area of a display that will be affected by the scrolling command. This may include determining an area of a current rendering that will be affected by the scrolling command. For example, the rendering may include graphics for a window border, application buttons, etc. that are not changed as a result of the scrolling command. However, the rendering may include shapes, text, tables, etc. that will be affected by the scrolling command.

At block 520, processing logic generates a copy command that will cause a remote client to copy contents from a first region within the affected area of the display. Processing logic additionally creates a paste command to paste the contents to a second region within the affected area. The second region is offset from the first region in the determined scrolling direction by the determined number of pixels. Some portion of the first region and the second region may overlap. For example, the first region may include vertical pixel lines 3-33 and the second region may include vertical pixel lines 13-43.

At block 525, processing logic generates an image that will be rendered to the display of a remote client device. The image may be rendered to a third region of the display, which may be a portion of the first region. At block 530, processing logic generates a drawing command to render the image to a portion of the first region vacated by the transposition of the contents of the first region to the second region. For example, a display may include 420 vertical pixel lines. Vertical pixel lines 21-400 may be affected by the scrolling. An example scrolling command may scroll the current contents of the display down 3 pixels. The contents of vertical pixel lines 31-397 may be copied and pasted to vertical pixel lines 34-400. A new image to be rendered to vertical pixel lines 31-33 may be generated, and the command to render the image to vertical pixel lines 31-33 may be generated.

Figure 6:
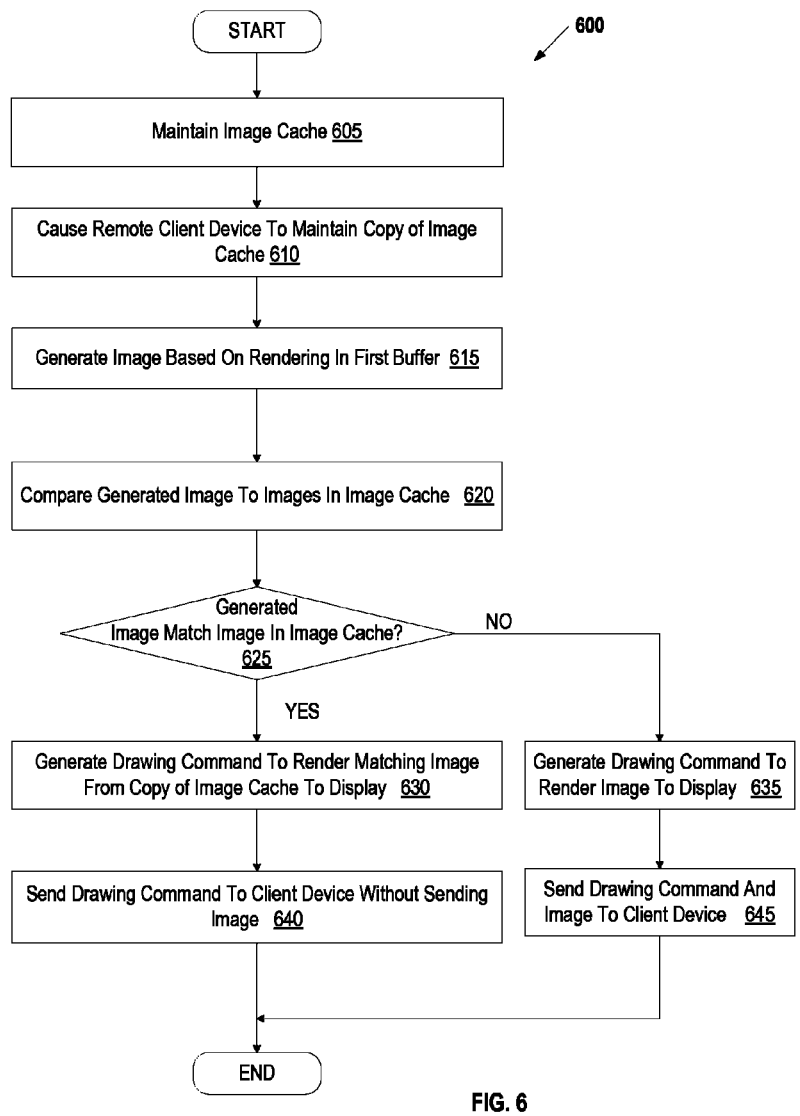
FIG. 6 is a flow diagram of one embodiment for a method of optimizing rendering of images on a remote client device using an image cache.

FIG. 6 is a flow diagram of one embodiment for a method 600 of optimizing rendering of images on a remote client device using an image cache. Method 600 may be performed in conjunction with method 300, method 400 and/or method 500. In one embodiment, blocks 615 to 635 of method 600 are performed at block 315 of method 300.

At block 605 of method 600, processing logic maintains an image cache. At block 610, processing logic causes a remote client to maintain a copy of the image cache. The image caches may contain pre-generated images that are frequently used by an application and/or may include most recent images that have been rendered to a display of a client device. The image cache maintained by image cache manager and the client's image cache may maintain synchronization by having the same cache size, cache advancement policies, cache ordering policies and/or cache eviction policies.

At block 610, processing logic generates an image based on a rendering in a first buffer. At block 620, processing logic compares the generated image to images in the image cache. At block 625, processing logic determines whether the generated image (or a portion of the generated image) matches any of the images in the image cache. If a match is found, the method proceeds to block 630. If no match is found, the method continues to block 635.

At block 630, processing logic generates a drawing command to render the matching image from the copy of the image cache maintained by the remote client to specified coordinates of a display. At block 640, processing logic sends the drawing command to the client device. The drawing command may be sent without sending a copy of the image to the client device. Accordingly, system resources can be conserved.

At block 635, processing logic generates a drawing command to render the image to the display. At block 645, processing logic sends the drawing command and the image to the client device.

Figure 7:
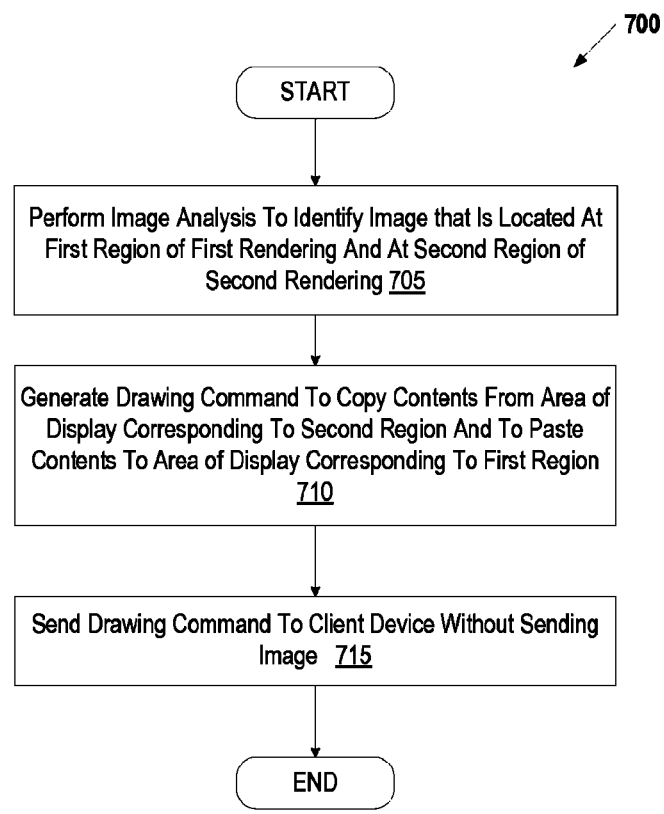
FIG. 7 is a flow diagram of one embodiment for a method of optimizing rendering of images on a remote client device.

FIG. 7 is a flow diagram of one embodiment for a method of optimizing rendering of images on a remote client device. Method 700 may be performed in conjunction with method 300, method 400, method 500 and/or method 600. In one embodiment, method 700 is performed at block 315 of method 300.

At block 705 of method 700, processing logic performs image analysis on a first rendering and a second rendering. The second rendering may reflect a current rendering in a display of a client device. The image analysis may be performed using standard techniques in the art. For example, processing logic may perform object recognition using techniques such as edge matching, grayscale matching, gradient matching, intensity matching, interpolation trees, geometric hashing, and so forth. The image analysis is performed to identify an image (e.g., an object) that is located at a first region in the first rendering and also at a second region of the second rendering.

At block 710, processing logic generates a drawing command to copy contents from an area of a display corresponding to the second region and to paste the contents to an area of the display corresponding to the first region. At block 715, processing logic sends the drawing command to the client device without sending the image to the client device.

Figure 8:
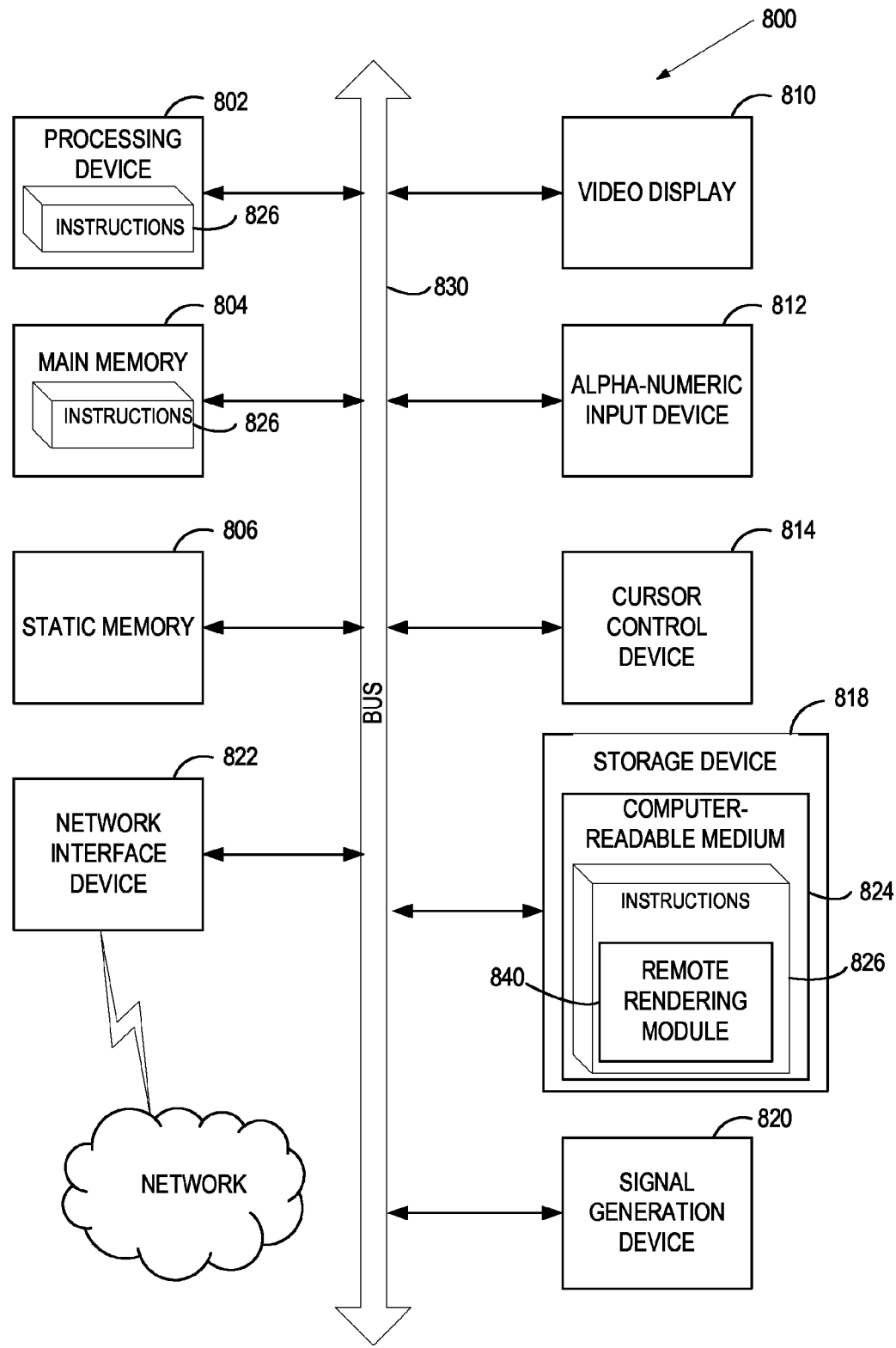
FIG. 8 is a block diagram of an exemplary computer system that may perform one or more of the operations described herein.

FIG. 8 illustrates a diagrammatic representation of a machine in the exemplary form of a computer system 800 within which a set of instructions, for causing the machine to perform any one or more of the methodologies discussed herein, may be executed. In alternative embodiments, the machine may be connected (e.g., networked) to other machines in a LAN, an intranet, an extranet, or the Internet.

The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 800 includes a processing device 802, a main memory 804 (e.g., read-only memory (ROM), flash memory, dynamic random access memory (DRAM) such as synchronous DRAM (SDRAM) or Rambus DRAM (RDRAM), etc.), a static memory 806 (e.g., flash memory, static random access memory (SRAM), etc.), and a data storage device 818, which communicate with each other via a bus 830.

Processing device 802 represents one or more general-purpose processing devices such as a microprocessor, central processing unit, or the like. More particularly, the processing device 802 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 802 may also be one or more special-purpose processing devices such as an application specific integrated circuit (ASIC), a field programmable gate array (FPGA), a digital signal processor (DSP), network processor, or the like. The processing device 802 is configured to execute instructions 826 for performing the operations and steps discussed herein.

The computer system 800 may further include a network interface device 822. The computer system 800 also may include a video display unit 810 (e.g., a liquid crystal display (LCD) or a cathode ray tube (CRT)), an alphanumeric input device 812 (e.g., a keyboard), a cursor control device 814 (e.g., a mouse), and a signal generation device 820 (e.g., a speaker).

The data storage device 818 may include a computer-readable storage medium 824 on which is stored one or more sets of instructions 826 embodying any one or more of the methodologies or functions described herein. For example, the instructions 826 may include instructions for a remote rendering module 840. The instructions 826 may also reside, completely or at least partially, within the main memory 804 and/or within the processing device 802 during execution thereof by the computer system 800, the main memory 804 and the processing device 802 also constituting machine-accessible storage media.

While the computer-readable storage medium 824 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instructions for execution by the machine and that cause the machine to perform any one or more of the methodologies of the present invention. The term "computer readable storage medium" shall accordingly be taken to include, but not be limited to, solid-state memories, optical media, and magnetic media.

In the above description, numerous details are set forth. Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "generating", "receiving", "transmitting", "comparing", "subtracting" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

It is to be understood that the above description is intended to be illustrative, and not restrictive. It will be apparent to one skilled in the art that embodiments of the present invention may be practiced without these specific details. Many other embodiments will be apparent to those of skill in the art upon reading and understanding the above description. In some instances, well-known structures and devices have been shown in block diagram form, rather than in detail, in order to avoid obscuring the present invention. The scope of the invention should, therefore, be determined with reference to the appended claims, along with the full scope of equivalents to which such claims are entitled.

I claim:

1. A method comprising:
receiving, by a processing device executing an application, graphical output data from the application;
generating, by the processing device, in view of the graphical output data, an image and a drawing command that are formatted for an application programming interface (API) of a web browser, wherein the image comprises differences between pixel values of corresponding pixels of a first rendering and a second rendering and wherein the drawing command comprises a command to add the differences to corresponding pixels of the current rendering in the display; and transmitting the image and the drawing command to a web browser instance executing on a remote client device, wherein the web browser instance is natively capable of rendering the drawing command to a display on the remote client device.

2. The method of claim 1, further comprising:
generating, by the processing device, the first rendering of the graphical output data in a first buffer, wherein the image or the drawing command is generated in view of the first rendering.

3. The method of claim 2, further comprising:
comparing the first rendering in the first buffer to the second rendering in a second buffer, wherein the second rendering reflects a current rendering in the display on the remote client device;
determining differences between first pixel values of first pixels in the first rendering and second pixel values of corresponding second pixels in the second rendering in view of the comparison; and
updating the second rendering in the second buffer in view of the first rendering in the first buffer.

4. The method of claim 3, further comprising:
performing image analysis to identify that the image is located at a first region of the first rendering and at a second region of the second rendering, wherein the drawing command comprises a command to copy contents from an area of the display corresponding to the second region and to paste the contents to another area of the display corresponding to the first region.

5. The method of claim 1, wherein the graphical output data is received from the application in response to the application receiving an input command from the web browser instance via a bi-directional connection between the application and the web browser instance, and wherein the image and drawing command are transmitted to the web browser instance via the bi-directional connection.

6. The method of claim 5, wherein the bi-directional connection is a web sockets connection, wherein the API of the web browser is a canvas element API, and wherein the display on the remote client device comprises a canvas element.

7. The method of claim 1, further comprising:
intercepting a scrolling command from the web browser instance;
determining a scrolling direction and a number of pixels scrolled; and
identifying an area of the display affected by the scrolling command, wherein the drawing command comprises a command to copy contents from a first region within the area in the current rendering and to paste the contents to a second region within the area that is offset from the first region in the determined scrolling direction by the determined number of pixels.

8. The method of claim 1, further comprising:
maintaining an image cache;
causing the remote client device to maintain a copy of the image cache; and
determining that the image corresponds to an image in the image cache, wherein the drawing command comprises a command to render the image from the copy of the image cache.

9. The method of claim 8, further comprising:
moving the image to a front of the image cache in response to generating the drawing command.

10. The method of claim 1, wherein the application does not have native support to be accessed remotely via a network.

11. A non-transitory computer readable storage medium including instructions that, when executed by a processing device, cause the processing device to perform operations comprising:
receiving, by the processing device, graphical output data from an application;
generating, by the processing device, in view of the graphical output data, an image and a drawing command that are formatted for an application programming interface (API) of a web browser, wherein the image comprises differences between pixel values of corresponding pixels of a first rendering and a second rendering and wherein the drawing command comprises a command to add the differences to corresponding pixels of the current rendering in the display; and
transmitting the image and the drawing command to a web browser instance executing on a remote client device, wherein the web browser instance is natively capable of rendering the drawing command to a display on the remote client device using the API.

12. The non-transitory computer readable storage medium of claim 11, the operations further comprising:
generating the first rendering of the graphical output data in a first buffer, wherein the image or the drawing command is generated in view of the first rendering.

13. The non-transitory computer readable storage medium of claim 12, the operations further comprising:
comparing the first rendering in the first buffer to the second rendering in a second buffer, wherein the second rendering reflects a current rendering in the display on the remote client device;
determining differences between first pixel values of first pixels in the first rendering and second pixel values of corresponding second pixels in the second rendering in view of the comparison; and
updating the second rendering in the second buffer in view of the first rendering in the first buffer.

14. The non-transitory computer readable storage medium of claim 13, the operations further comprising:
performing image analysis to identify that the image is located at a first region of the first rendering and at a second region of the second rendering, wherein the drawing command comprises a command to copy contents from an area of the display corresponding to the second region and to paste the contents to another area of the display corresponding to the first region.

15. The non-transitory computer readable storage medium of claim 11, wherein the graphical output data is received from the application in response to the application receiving an input command from the web browser instance via a bi-directional connection between the application and the web browser instance, and wherein the image and drawing command are transmitted to the web browser instance via the bi-directional connection.

16. The non-transitory computer readable storage medium of claim 15, wherein the bi-directional connection is a web sockets connection, wherein the API of the web browser is a canvas element API, and wherein the display on the remote client device comprises a canvas element.

17. The non-transitory computer readable storage medium of claim 11, the operations further comprising:
intercepting a scrolling command from the web browser instance;
determining a scrolling direction and a number of pixels scrolled; and identifying an area of the display affected by the scrolling command, wherein the drawing command comprises a command to copy contents from a first region within the area in the current rendering and to paste the contents to a second region within the area that is offset from the first region in the determined scrolling direction by the determined number of pixels.

18. The non-transitory computer readable storage medium of claim 11, the operations further comprising:
maintaining an image cache;
causing the remote client device to maintain a copy of the image cache; and
determining that the image corresponds to an image in the image cache, wherein the drawing command comprises a command to render the image from the copy of the image cache.

19. The non-transitory computer readable storage medium of claim 18, the operations further comprising:
moving the image to a front of the image cache in response to generating the drawing command.

20. The non-transitory computer readable storage medium of claim 11, wherein the application does not have native support to be accessed remotely via a network.

21. A computing apparatus comprising:
a memory to store instructions; and
a processing device, coupled to the memory, to execute the instructions, wherein the processing device is to:
receive graphical output data from an application;
generate, in view of the graphical output data, an image and a drawing command that are formatted for an application programming interface (API) of a web browser, wherein the image comprises differences between pixel values of corresponding pixel values of a first rendering and a second rendering and wherein the drawing command comprises a command to add the differences to corresponding pixels of the current rendering in the display; and
transmit the image and the drawing command to a web browser instance running on a remote client device, wherein the web browser instance is natively capable of rendering the drawing command to a display on the remote client device.

22. The computing apparatus of claim 21, wherein the processing device is further to generate the first rendering of the graphical output data in a first buffer, wherein the image or the drawing command is generated in view of the first rendering.

23. The computing apparatus of claim 22, wherein the processing device is further to:
compare the first rendering in the first buffer to the second rendering in a second buffer, wherein the second rendering reflects a current rendering in the display on the remote client device;
determine differences between first pixel values of first pixels in the first rendering and second pixel values of corresponding second pixels in the second rendering in view of the comparison; and
update the second rendering in the second buffer in view of the first rendering in the first buffer.

24. The computing apparatus of claim 21, wherein the application does not have native support to be accessed remotely via a network.

* * * * *